(12) United States Patent
Sampathkumar

(10) Patent No.: US 7,937,548 B2
(45) Date of Patent: May 3, 2011

(54) SYSTEM AND METHOD FOR IMPROVED SNAPCLONE PERFORMANCE IN A VIRTUALIZED STORAGE SYSTEM

(75) Inventor: Kishore Kaniyar Sampathkumar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 12/167,251

(22) Filed: Jul. 3, 2008

(65) Prior Publication Data
US 2009/0292890 A1  Nov. 26, 2009

(30) Foreign Application Priority Data
May 21, 2008 (IN) .......................... 1237/CHE/2008

(51) Int. Cl.
*G06F 12/16* (2006.01)
(52) U.S. Cl. ........ 711/162; 711/161; 707/639; 707/657; 707/659
(58) Field of Classification Search .................. None
See application file for complete search history.

(56) References Cited

U.S. PATENT DOCUMENTS

| | | | |
|---|---|---|---|
| 6,618,794 B1 * | 9/2003 | Sicola et al. ................. | 711/154 |
| 6,915,397 B2 | 7/2005 | Lubbers | |
| 7,043,605 B2 | 5/2006 | Suzuki | |
| 7,085,899 B2 | 8/2006 | Kim | |
| 7,206,961 B1 | 4/2007 | Mutalik | |
| 7,287,045 B2 * | 10/2007 | Saika et al. ............................ | 1/1 |
| 7,467,268 B2 * | 12/2008 | Lindemann et al. .......... | 711/162 |
| 2004/0083345 A1 * | 4/2004 | Kim et al. .................... | 711/162 |
| 2006/0206677 A1 * | 9/2006 | Kim et al. .................... | 711/162 |
| 2007/0245104 A1 * | 10/2007 | Lindemann et al. .......... | 711/162 |

OTHER PUBLICATIONS http://en.wikipedia.org/wiki/Logical_Volume_Manager_(Linux), Jan. 24, 2011.

\* cited by examiner

*Primary Examiner* — Jack A Lane

(57) ABSTRACT

A system and method of creating a snapclone for on-line point-in-time complete backup in a virtualized storage system is disclosed. In one embodiment, a method for creating a snapclone for on-line point-in-time complete backup in a virtualized storage system includes receiving a copy operation directed to one or more identified segments of an original virtual disk, in response to the copy operation, substantially sequentially copying the one or more identified segments to a snapclone virtual disk, clearing bits in an in-memory sharing bitmap associated with already copied one or more identified segments, and writing the cleared bits in the in-memory sharing bitmap to a disk resident virtual disk metadata associated with the snapclone virtual disk upon receiving a current write I/O operation while the copy operation is in progress. The received current write I/O operation is targeting data outside the LBA range of the already copied one or more identified segments.

14 Claims, 5 Drawing Sheets

SYSTEM AND METHOD FOR IMPROVED SNAPCLONE PERFORMANCE IN A VIRTUALIZED STORAGE SYSTEM

RELATED APPLICATIONS

Benefit is claimed under 35 U.S.C. 119(a)-(d) to Foreign application Ser No. 1237/CHE/2008 entitled "SYSTEM AND METHOD FOR IMPROVED SNAPCLONE PERFORMANCE IN A VIRTUALIZED STORAGE SYSTEM" by Hewlett-Packard Development Company, L.P., filed on 21st May 2008, which is herein incorporated in its entirety by reference for all purposes.

BACKGROUND

Increased use of Internet based applications and e-commerce transactions result in increased volume of data being exchanged between users. Accordingly, the demands for large network storage space are on the rise as well as a need to provide means for effectively sharing large quantity of information at a higher data transmission speed. This is addressed by employing technologies such as network-attached storage (NAS) and storage area network (SAN) systems.

However, a significant difficulty in providing storage is not in providing the large quantity of storage, but in ensuring that storage capacity is provided in a manner that enables ready and reliable access to data with simple interfaces. Large capacity, high availability and high reliability storage systems typically involve complex topologies of physical storage devices and controllers. Large capacity storage systems are those having greater capacity than single mass storage devices. High reliability and high availability storage systems refer to systems that spread data across multiple physical storage systems to ameliorate risk of data loss in the event of one or more physical storage failures. Both large capacity and high availability/high reliability systems are made possible by high end storage devices such as redundant array of independent disk (RAID) systems.

Associated with the use of high end storage devices, is a virtualized storage system which provides transparent abstraction of storage at the block level. It is possible to generate and maintain backup copies of data on the storage devices in the virtualized storage system in a manner that ensures that the enterprise demands for data (e.g., security, large capacity and high availability) are met. Techniques like snapshot operations are implemented on the virtualized storage system to ensure that the above demands are met. A snapshot operation creates a new logical disk called snapshot logical disk (also referred in short, as snapshot). A snapshot is a point-in-time readable/writable consistent copy of the data in the original logical disk which is created substantially instantaneously.

When a snapshot is created, no user data needs to be copied. Instead, a sharing relationship is created between the snapshot and the original logical disk. A first update to any data in either the original logical disk or the snapshot results in a prior copying of the corresponding data from the original logical disk to the snapshot. This is sometimes referred as Copy on First Write (COFW) operation.

A variation of the snapshot operation is called snapclone operation wherein a permanent copy of the logical disk is created for normal and interactive use. This is termed as the snapclone logical disk or in short, snapclone. The snapclone operation employs similar techniques and mechanisms used in the snapshot operation with one additional feature, wherein, the snapclone copy processes are typically run in the background on the virtualized storage system with appropriate priority to ensure that almost no disruption happens to user I/O requests. These snapclone copy processes copy the data from an original logical disk to a snapclone logical disk in its entirety.

A disadvantage of the current snapclone operation (similarly applicable to the current snapshot operation) is its inability to distinguish two different contexts in which a clear bit operation is performed on a sharing bitmap associated with the snapclone operation. For example, in a scenario where no user I/O requests are issued while a snapclone operation is in progress and the original virtual disk is one terabyte in size, a complete snapclone operation involves copying over one million (1024*1024) segments (i.e. one segment is equivalent to one megabyte) of data to the snapclone virtual disk and performing one million synchronous writes (updates) to the on-disk sharing bitmap. This can lead to significantly large number of I/O operations thereby degrading the overall performance of the virtualized storage system.

BRIEF DESCRIPTION OF THE DRAWINGS

Example embodiments are illustrated by way of example and not limitation in the figures of the accompanying drawings, in which like references indicate similar elements and in which.

Figure 1:
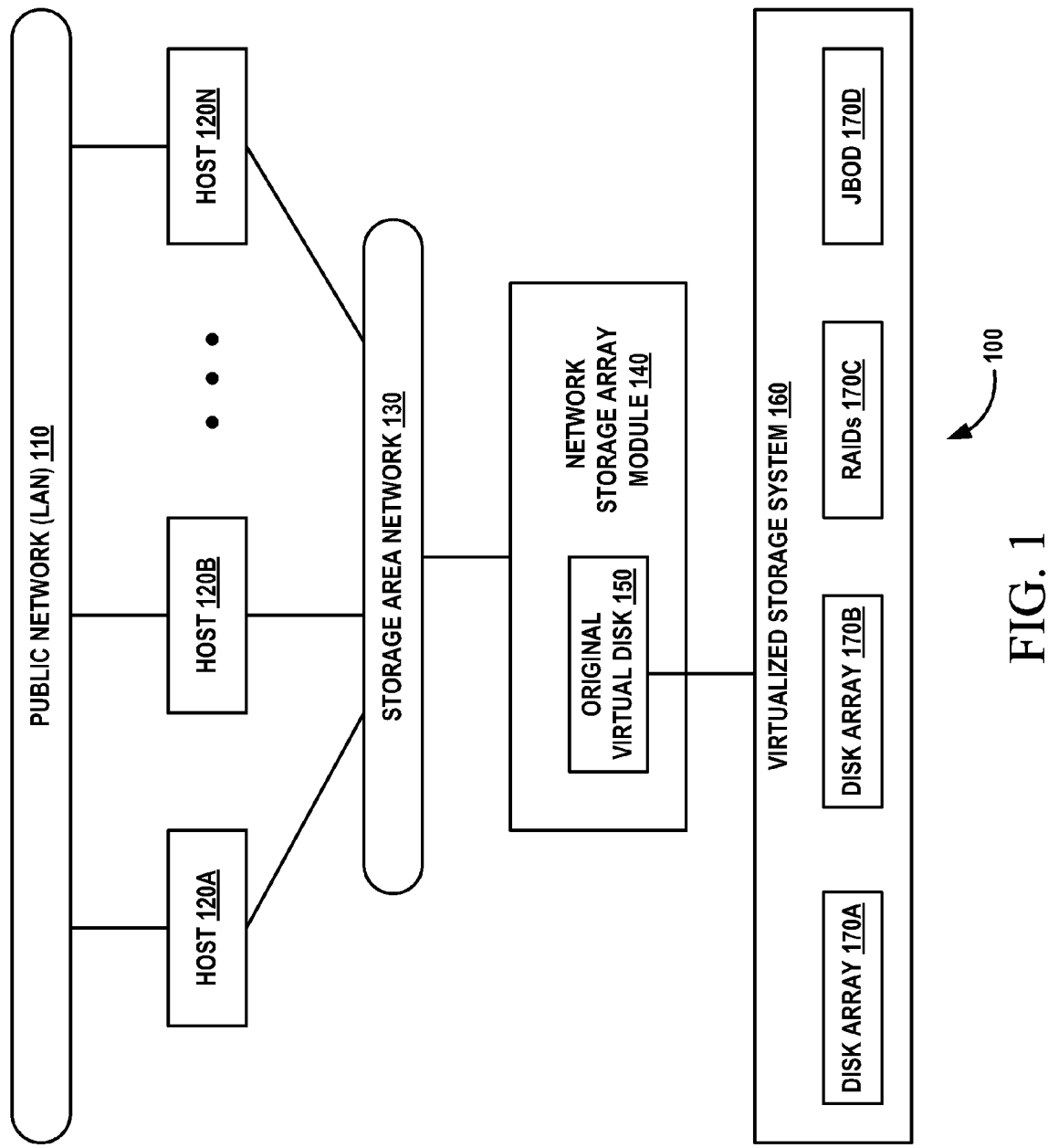
FIG. 1 is a block diagram illustrating a network storage based on a virtualized storage system, according to one embodiment.

Other features of the present embodiments will be apparent from the accompanying drawings and from the detailed description that follows.

DETAILED DESCRIPTION

A system and method for creating a snapclone for on-line backup in a network storage based on a RAID array is disclosed. In the following description, for purposes of explanation, numerous specific details are set forth in order to provide a thorough understanding of the various embodiments. It will be evident, however, to one skilled in the art that the various embodiments may be practiced without these specific details.

The terms "already copied one or more identified segments" and "already copied logical block address (LBA) range" are used interchangeably throughout the document. The terms "copy operation" refers both to "COFW operation" as well as the copying of data segment performed in the context of snapclone copy processes. The terms "Logical Disk" and "Virtual Disk" are used interchangeably throughout the document. Further, the term "vdisk" refers to a virtual disk and the terms "on-disk sharing bitmap", "disk resident sharing bitmap" and "disk resident virtual disk metadata" are used interchangeably throughout the document. Also, the terms "read request" and "read I/O request" are used interchangeably throughout the document. Further, the terms "write request" and "write I/O request" are used interchangeably throughout the document.

A typical snapclone operation has a bitmap called "sharing bitmap" (also referred to as bitmap) having one bit for each segment of data which represents a corresponding content segment (e.g. one megabyte) of a vdisk. A set bit (refers to setting a bit to "1") indicates that the data at that segment is "shared" and needs to be copied to a snapclone. Initially, at the snapclone creation time, the entire sharing bitmap is filled with 1s. This bitmap is maintained both on the disk (i.e. on-disk sharing bitmap) for correctness and consistency and in volatile memory (i.e. in-memory sharing bitmap) for efficiency. The snapclone operation uses the bitmap to keep track of the copying process and as such needs to update the in-memory sharing bitmap and the on-disk sharing bitmap.

The method for creating a snapclone operation that alleviates the need to update the on-disk sharing bitmap until a first write I/O operation is issued (typically by a user application) includes:

(1) initializing to zero a bit index called flush-fence that points to a position in the sharing bitmap starting from which, the on-disk sharing bitmap is out of synchronization with the in-memory sharing bitmap. The flush-fence is maintained in volatile memory.

(2) initializing to zero a bit index called copy-fence that points to the first set bit in the in-memory sharing bitmap. The copy-fence is maintained in volatile memory.

(3) when there are more segments to be copied from an original vdisk to a snapclone (i.e., when there are bits set in the in-memory sharing bitmap):
  (a) copying a corresponding segment of data from the original vdisk to the snapclone;
  (b) clearing the corresponding bit in the in-memory sharing bitmap;
  (c) incrementing copy-fence to point to the next set bit (i.e. non-zero bit).

While the above segment copy operation is taking place, a write I/O operation may be issued by a user application on the original vdisk. The write I/O operation can either concern with data that is on an LBA range that is not yet copied over to the snapclone or is within the LBA range that is already copied over to the snapclone.

If the write I/O operation concerns with data outside the LBA range of the already copied segments and if the bit for the corresponding segment is set in the in-memory sharing bitmap, the following process take place:
  (i) copying a corresponding segment of data from the original vdisk to the snapclone;
  (ii) clearing the corresponding bit in the in-memory sharing bitmap;
  (iii) synchronously flushing the in-memory sharing bitmap to the on-disk sharing bitmap; and
  (iv) incrementing copy-fence to point to the next set bit if it is currently pointing to a cleared bit.
  (v) updating the value of flush-fence to the value of copy-fence Given the segment copying operation is progressing in parallel, the synchronous update to the on-disk sharing bitmap due to the received write I/O operation also results in clearing the bits in the on-disk sharing bitmap corresponding to all the bits cleared previously in the in-memory sharing bitmap, but not yet updated to the on-disk sharing bitmap.

If the write I/O operation concerns with data within the LBA range of the already copied segments (i.e., within the copy-fence), two possible scenarios can take place. First, if the concerned data corresponds to segment which is located before the flush-fence then the write I/O operation is issued on the original vdisk since the in-memory sharing bitmap is already updated to the on-disk sharing bitmap after the segments are copied from the original vdisk to the snapclone. Second, the concerned data corresponds to segment that is located at or beyond the flush-fence. This implies that the corresponding bit in the in-memory sharing bitmap is cleared but has yet to be updated to the on-disk sharing bitmap. In this case, the following process take place:
  (i) synchronously flushing the in-memory sharing bitmap to the on-disk sharing bitmap;
  (ii) updating the value of flush-fence to the value of copy-fence; and
  (iii) issuing the (user) write I/O operation on the original vdisk.

Various embodiments of the system and method for creating a snapclone are hereinafter further described with reference to FIGS. 1-5.

FIG. 1 is a block diagram 100 illustrating a network storage based on a virtualized storage system 160, according to one embodiment. Particularly, FIG. 1 illustrates a public network, such as LAN 110, a plurality of hosts 120A-N in communication with LAN 110, a storage area network (SAN) 130 coupled to the plurality of hosts 120A-N, a network storage array module 140 coupled to the SAN 130, and a virtualized storage system 160 coupled to the SAN 130 via the network storage array module 140. Further as shown in FIG. 1, the network storage array module 140 includes an original virtual disk 150. Furthermore as shown in FIG. 1, the virtualized storage system 160 includes a disk array 170A, disks 170B, RAIDs 170C, JBOD 170D and the like data storing devices.

In one exemplary implementation, the plurality of hosts 120A-N are configured to process an in-memory sharing bitmap and a disk resident virtual disk metadata associated with the virtualized storage system 160. Typically, the in-memory sharing bitmap and the disk resident virtual disk metadata associated with the snapclone virtual disk 210 are stored in the virtualized storage system 160. The disk resident virtual disk metadata includes a disk resident sharing bitmap for mirroring the in-memory sharing bitmap.

Figure 2:
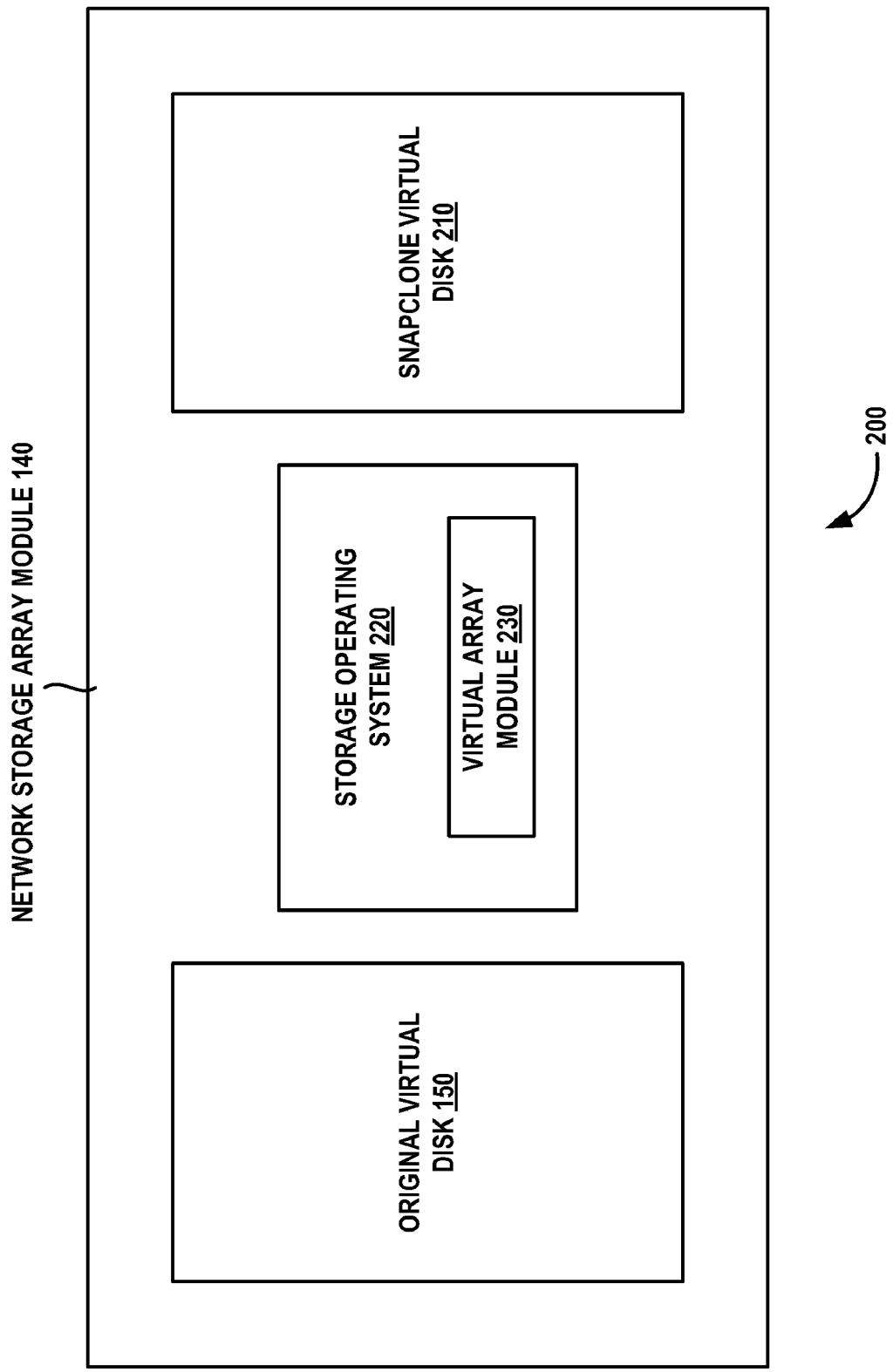
FIG. 2 is a block diagram illustrating major components of the network storage array module shown in FIG. 1, according to one embodiment.

FIG. 2 is a block diagram 200 illustrating major components of the network storage array module 140 shown in FIG. 1, according to one embodiment. The network storage array module 140 includes the original virtual disk 150, a snapclone virtual disk 210, and a storage operating system 220. As shown in FIG. 2, the storage operating system 220 includes a virtual array module 230.

In operation, the virtual array module 230 receives a copy operation directed to one or more identified segments of the original virtual disk 150. Further, the virtual array module 230 substantially sequentially copies the one or more identified segments to the snapclone virtual disk 210 upon receiving the copy operation. Upon successfully copying the one or more of the identified segments, the virtual array module 230 clears bits in the in-memory sharing bitmap associated with already copied one or more identified segments.

In one embodiment, the virtual array module 230 writes the cleared bits in the in-memory sharing bitmap to the disk resident virtual disk metadata associated with the snapclone virtual disk 210 upon receiving a current write I/O operation from a user application while the copy operation is in progress. Typically, the received current write I/O operation is targeting data outside the LBA range of the already copied one or more identified segments. Further, the virtual array module 230 initializes the in-memory sharing bitmap. In one embodiment, the virtual array module 230 initializes the in-memory sharing bitmap by performing a set bit for each bit in the in-memory sharing bitmap, following which, the in-memory sharing bitmap is written to the disk resident sharing bitmap.

In one embodiment, the virtual array module 230 determines whether the received current write I/O operation is targeting data outside the LBA range of the already copied remaining one or more identified segments. If the received current write I/O operation is targeting data outside the LBA range of the already copied remaining one or more identified segments, the virtual array module 230 writes the cleared bits in the in-memory sharing bitmap to the disk resident sharing bitmap associated with the original virtual disk 150 upon receiving the current write I/O operation from a user application while the copy operation is in progress. If the received current write I/O operation is targeting data within the LBA range of the already copied remaining one or more identified segments and the cleared bits in the in-memory sharing bitmap are not written to the on-disk sharing bitmap, and the cleared bits in the in-memory sharing bitmap are written to the on-disk sharing bitmap upon receiving a current write I/O operation while the copy operation is in progress.

Upon completing copying the remaining one or more identified segments, the virtual array module 230 clears the bits in the in-memory sharing bitmap associated with already copied remaining one or more identified segments. In another embodiment, the virtual array module 230 writes the cleared bits in-memory sharing bitmap to the disk resident virtual disk metadata associated with the snapclone virtual disk 210 upon receiving a next write I/O operation from a user application while the copy operation is in progress. Typically, the next write I/O operation is substantially targeting data either outside the LBA range of the already copied remaining one or more identified segments or within the LBA range in which the cleared bits in the in-memory sharing bitmap are not yet written to the on-disk sharing bitmap. Further, the virtual array module 230 deletes the in-memory sharing bitmap and the disk resident sharing bitmap upon completion of copying of all the one or more identified segments.

Figure 3:
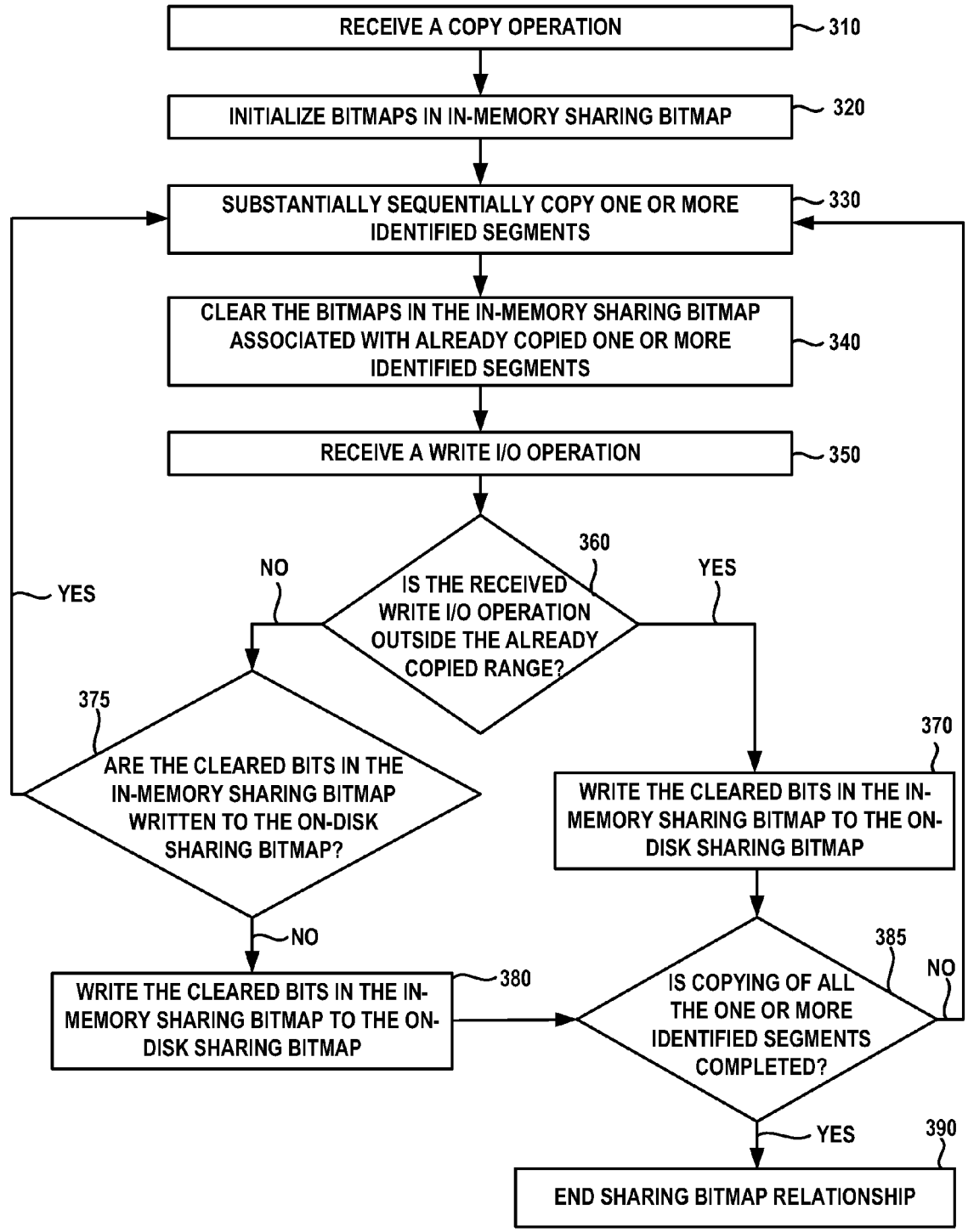
FIG. 3 is a process flow of creating a snapclone for on-line point-in-time complete backup in the virtualized storage system, according to one embodiment.

FIG. 3 is a process flow 300 of creating a snapclone for on-line point-in-time complete backup in a virtualized storage system 160, according to one embodiment. In step 310, a copy operation directed to one or more identified segments of an original virtual disk (i.e., the original virtual disk 150 of FIG. 1) is received. In step 320, the in-memory sharing bitmap is initialized by setting each bit in the in-memory sharing bitmap to "1". In step 330, the one or more identified segments are substantially sequentially copied to a snapclone virtual disk (i.e., the snapclone virtual disk 210 of FIG. 2), in response to the received copy operation.

In step 340, the bits in the in-memory sharing bitmap associated with already copied one or more identified segments are cleared. In step 350, a write I/O operation is received from a user application. In step 360, a check is made to determine whether the received write I/O operation is targeting data outside the LBA range of the already copied one or more identified segments.

In step 370, if the received write I/O operation is targeting data outside the LBA range of the already copied one or more identified segments, the cleared bits in the in-memory sharing bitmap is written to the on-disk sharing bitmap upon receiving the current write I/O operation from a user application while the copy operation is in progress.

If the received write I/O operation is targeting data within the LBA range of the already copied one or more identified segments, a check is made to determine whether the cleared bits in the in-memory sharing bitmap are written to the on-disk sharing bitmap in step 375. If the cleared bits in the in-memory sharing bitmap are written to the on-disk sharing bitmap, then the process flow 300 repeats the steps 330-360 in which, the copy operation of the remaining one or more identified segments is performed. If the cleared bits in the in-memory sharing bitmap are not written to the on-disk sharing bitmap, then the cleared bits in the in-memory sharing bitmap are written to the on-disk sharing bitmap upon receiving a current write I/O operation while the copy operation is in progress in step 380. Further, the bits in the in-memory sharing bitmap associated with already copied remaining one or more identified segments are cleared.

In accordance with the above mentioned steps 310-380, the sequence of steps for the copy operation, initiated during a snapclone operation, are performed as follows.

I) initialize the in-memory sharing bitmap by setting the bits therein to "1".
II) write the in-memory sharing bitmap to on-disk sharing bitmap.
III) set a bit index (i.e., the bit index refers to bit location in the bitmap) called copy-fence to point to a next set bit in the in-memory sharing bitmap (i.e., a non-zero bit)
IV) set a bit index called flush-fence with the value same as that of copy-fence.
V) when there are one or more segments remain to be copied from the original virtual disk 150 to the snapclone virtual disk 210, then the following operations are performed:
   a. copy the identified segment from the original virtual disk 150 to the snapclone virtual disk 210.
   b. clear bits corresponding to the copied segments in the in-memory sharing bitmap.
   c. increment copy-fence to point to a next set bit in the in-memory sharing bitmap (i.e., a non-zero bit).

While the copy operation associated with the snapclone operation is in progress, a write I/O operation may be issued by user applications on the original virtual disk 150. The write I/O operation can either be targeting data outside or within the already copied logical block address (LBA) range. As explained above, if the received write I/O operation is targeting data outside the already copied LBA range, then step 370 is performed. Else, if the received write I/O operation is targeting data inside the already copied LBA range, but outside the LBA range before which the corresponding cleared bits in the in-memory sharing bitmap have been updated to the on-disk sharing bitmap, then steps 375 and 380 are performed. In both step 370 and step 375, the flush-fence should be set with the value of copy-fence. As explained above, the step 360 refers to the copy-fence and the step 375 refers to the flush-fence. Else, steps 320-360 are repeated.

In step 385, a check is made to determine whether copying the one or more identified segments is completed. If completed, in step 390, the process flow 300 ends the sharing bitmap relationship in step 390. In addition, when copying the one or more identified segments is completed, the in-memory sharing bitmap and the disk resident sharing bitmap are deleted. If copying the one or more identified segments is not completed, then the process flow goes to step 330 and continues thereon.

Figure 4:
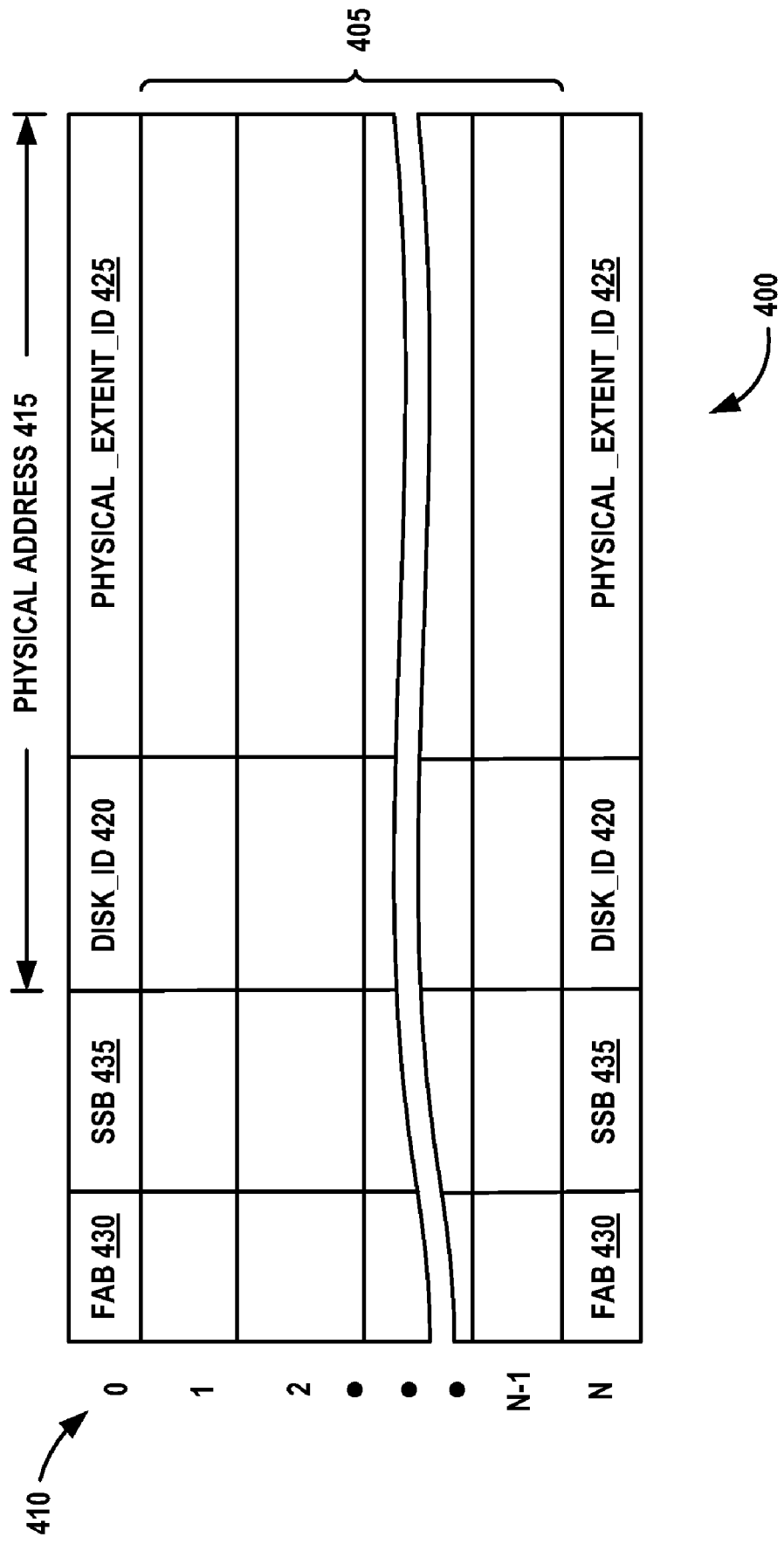
FIG. 4 is an example mapping table, according to one embodiment.

FIG. 4 is an example mapping table 400 according to one embodiment. Particularly, FIG. 4 illustrates a structure of a mapping entry 405 of the mapping table 400 and a mapping table scheme of the snapclone virtual disk 210.

Each of the mapping entry 405 includes a first allocation bit (FAB) 430, a snapclone status bit (SSB) 435, and a physical address 415 of a physical disk block. The physical address 415 includes an address (Disk_ID) 420 of a disk partition and an address (Physical_Extent_ID) 425 of the physical disk block.

When a data block is allocated, the physical address 415 of the mapping entry 405 is changed to map an actual disk block. The FAB 430 is a bit for distinguishing the data blocks which is first allocated after the snapclone is created. For example, after the snapclone is created, the value of the FAB 430 is changed to "1" and the mapping entry 405 is recorded on the disk.

The SSB 435 is a bit representing the status of the snapclone. When the SSB 435 is "1", it means that a copy operation is carried out after the snapclone is created. This indicates that content from the original virtual disk 150 is copied to the snapclone virtual disk 210. When the SSB 435 is "0", it means that the copy operation is not yet carried out. This indicates that content in the snapclone vdisk 210 is associated with the original vdisk 150 which itself represents time $T_0$. The bits are allocated as many times as the number of segments 410 of the snapclone, as the SSB 435 is maintained at each mapping entry 405.

During a mapping table initialization process, both the FAB 430 and the SSB 435 are initialized to "0". The mapping table 400 is maintained in the in-memory for enabling efficiency and on disk for ensuring correctness and consistency.

During the mapping table initialization process, changes made to the mapping entries 405 are not considered as updates. Upon completion of the mapping table initialization process, any change to any mapping entry 405 results in updating the in-memory sharing bitmap as well as disk resident sharing bitmap. Further, any updates to the mapping entry 405 is first performed in the in-memory sharing bitmap and then to the corresponding disk resident sharing bitmap. The initialization process is performed first in the in-memory sharing bitmap, and as part of the completion of the initialization process, the mapping table 400 is written to the disk resident sharing bitmap.

Once the process of reading the original mapping entry 405 is completed, the snapclone process can determine whether or not the copy operation is carried out. Further, the FAB 430 is set to "1" (with respect to the data block which is first allocated after the snapclone is created), and an operation of reflecting the mapping entry 405 in the snapclone vdisk is carried out. In the process of determining whether the copy operation is carried out or not, and if the FAB 430 is "1", it is inferred that the allocation is complete. Alternatively, if the FAB 430 is "0", a determination is made whether allocation is to be carried out or not. The determination is achieved by checking the status of SSB 435 as mentioned above. As described above, the execution of the copy operation is determined based on the SSB 435. It should be noted that, if the copy operation is yet to be carried out, then the allocation is to be carried out first. Once the allocation is carried out, four possible scenarios such as read operation issued on the original virtual disk 150, read operation issued on the snapclone virtual disk 210, write operation issued on the original virtual disk 150, and write operation issued on the snapclone virtual disk 210 emerge. It can be noted that the read operation issued on the original virtual disk 150 is considered irrelevant since processing the read requests on the original virtual disk 150 is neither affected by nor connected in any way to the status of FAB 430 or SSB 435.

In one embodiment, any read operation issued on the original virtual disk 150 is directed to the original virtual disk 150 since no extra processing is involved. For a read operation issued on the snapclone virtual disk 210, a read operation is carried out from the snapclone virtual disk 210 which represents time $T_0$, if the copy operation is already carried out (i.e., the SSB bit is set). Alternatively, if the copy operation is not carried out (i.e., the SSB bit is clear), the read operation is carried out from the original virtual disk 150 which represents time $T_0$.

Subsequently, if the read operation is issued on the snapclone virtual disk 210, then the allocation (e.g., as indicated and tracked by the FAB bit) need not be carried out. If a write operation is issued on the original virtual disk 150, and if the FAB 430 corresponding to this segment is "0", then the disk space for this segment on the snapclone virtual disk 210 is first allocated after which, FAB 430 for the corresponding segment is set to "1". If the FAB 430 corresponding to this segment is "1", a determination is made whether the corresponding segment is already copied from the original vdisk to snapclone vdisk by checking the value of SSB bit. If SSB 435 is set to "1", it indicates that the corresponding segment is already copied from the original vdisk to snapclone vdisk as a result of which the write operation issued can be directed to the original virtual disk 150 (without any further processing). If SSB 435 is set to "0", and given that FAB 430 entry is already set to "1" (e.g., indicating that the allocation is complete), this segment is copied from the original virtual disk 150 to the snapclone virtual disk 210, during which time the write operation is put on hold. On completion of the snapclone creation process, the corresponding SSB bit is set to "1". Further, the original write operation which is put on hold is now allowed to proceed on the original virtual disk 150.

If a write operation is issued on the snapclone virtual disk 210, the same process described for handling the write request on the original virtual disk 150 is applied. Further, in the case of handling the write request for the snapclone virtual disk 210, one skilled in the art can understand that once the SSB bit is set, then the write request is issued on the snapclone virtual disk 210.

In both the above-described cases, on issue of a write request, if the SSB bit is "1", the write request is directed to the corresponding vdisk (original vdisk or snapclone vdisk, as applicable) without any delay since the data for this segment has already been copied from the original vdisk to the snapclone vdisk.

It can be noted that, a prior step of allocation (e.g., also referred to hereinafter as pre-allocation) is performed for all the segments involved, resulting in FAB 430 entries being set to "1". This is usually carried out at the time of creating the snapclone virtual disk 210 as a part of the mapping table initialization process, prior to the arrival of any read/write requests which are affected either by FAB bit or the SSB bit. Such an approach is called space inefficient. In contrast, an approach where allocation is performed on demand and not at the time of creating the snapclone is called space efficient. It can be noted that, the above described technique (which is applicable to both space efficient and space inefficient schemes) is primarily intended for the space inefficient pre-allocation technique (e.g., where allocation is done a priori).

The FAB 430 and SSB 435 are acted upon by the snapclone copy process that runs in the background and does the copying of the content from the original virtual disk 150 to the snapclone virtual disk 210. This happens in parallel with the handling of write request, both on original virtual disk 150 and the snapclone virtual disk 210.

On completion of copying a segment, the corresponding SSB bit is cleared only in the in-memory sharing bitmap and is not updated to the disk resident sharing bitmap. Hence, for every SSB bit clear operation, in the context of the snapclone copy process, the corresponding disk I/O to update the cleared SSB bit is avoided. This results in increased performance of the virtualized storage system.

On completion of copying all the segments by the snapclone copy process, the SSB bits are discarded as the validity of SSB bits is only till the time the snapclone copy process is completed. This ensures data consistency and guarantees point-in-time data on the snapclone virtual disk 210. Once the snapclone is created, the content of the snapclone virtual disk 210 are kept intact.

In the absence of any I/O write requests being issued on the original virtual disk 150 until the completion of the snapclone copying process, the technique of avoiding disk I/O corresponding to updating the cleared SSB bits in the context of copying segments by the snapclone copy process ensures that the content of the snapclone virtual disk 210 are valid. After the snapclone is created, the SSB bits are discarded as the SSB bits are rendered obsolete.

Since the SSB bits are cleared in the in-memory sharing bitmap by the snapclone copy process after copying segments, and since the SSB bits are not updated to the disk resident sharing bitmap by the snapclone copy process, the SSB bits already cleared in the in-memory sharing bitmap are updated to the disk resident sharing bitmap. Updating SSB bits to the disk resident sharing map happens only when a next write request that results in clearing the SSB bit is completed. All the segments copied by the snapclone copy process (between the previous write request that resulted in clearing the SSB bit and the next write request that may result in clearing the SSB bit) are marked as "not copied" on the disk resident sharing bitmap whereas, they are marked as "copied" in the in-memory sharing bitmap of the corresponding SSB bits. However, since the SSB bits are discarded at the end of the snapclone copy process, the above process does not cause any re-copying of the already copied segments.

Figure 5:
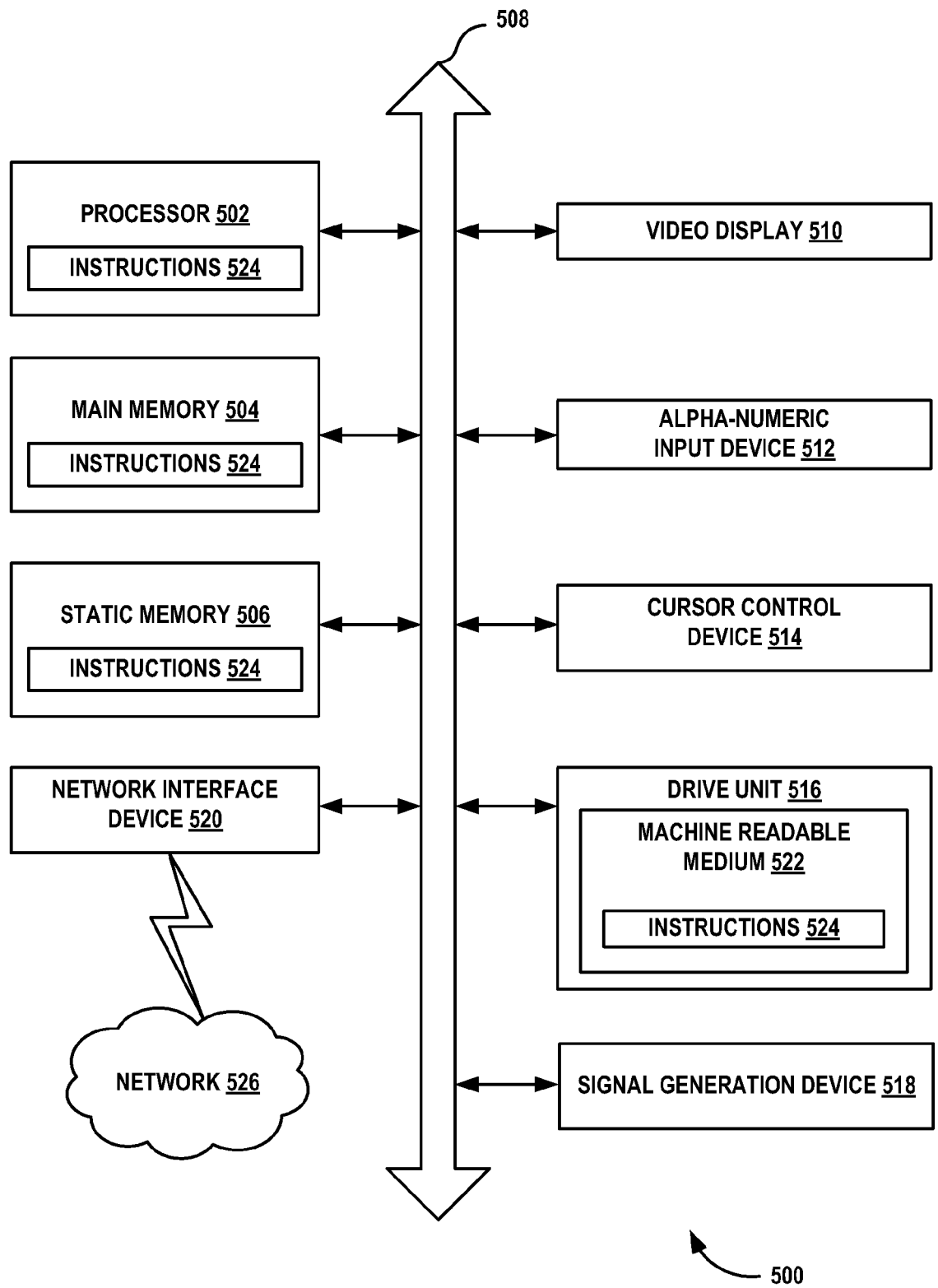
FIG. 5 is a diagrammatic system view of a data processing system in which any of the embodiments disclosed herein may be performed, according to one embodiment.

FIG. 5 is a diagrammatic system view 500 of a data processing system, according to one embodiment, in which any of the embodiments disclosed herein may be performed. The diagrammatic system view 500 illustrates a processor 502, a main memory 504, a static memory 506, a bus 508, a video display 510, an alpha-numeric input device 512, a cursor control device 514, a drive unit 516 which includes a machine readable medium 522, a signal generation device 518, a network interface device 520, instructions 524 accompanying various modules as shown in FIG. 5 and a network 526.

The processor 502 may be a microprocessor, a state machine, an application specific integrated circuit, a field programmable gate array and the like logic operating device. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a BIOS and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

For example, a storage medium having instructions, that when executed by a computing platform executes a method of creating a snapclone for on-line point-in-time complete backup in the virtualized storage system 160, including receiving the copy operation directed to one or more identified segments of the original virtual disk 150. In response to the copy operation, substantially sequentially copying the one or more identified segments to the snapclone virtual disk 210, clearing bits in the in-memory sharing bitmap associated with already copied one or more identified segments, and writing the cleared bits in-memory sharing bitmap to the disk resident virtual disk metadata associated with the snapclone virtual disk 210 upon receiving the current write I/O operation from the user application while the copy operation is in progress. In alternative embodiments, the received current write I/O operation is targeting data outside the LBA range of the already copied one or more identified segments.

The storage medium may have instructions to resume the copy operation, substantially sequentially, of remaining one or more identified segments to the snapclone virtual disk 210, to clear bitmaps in the in-memory sharing bitmap associated with already copied remaining one or more identified segments, and to write the cleared bits in-memory sharing bitmap to the disk resident virtual disk metadata associated with the snapclone virtual disk 210 upon receiving a next write I/O operation from a user application while the copy operation is in progress. In alternative embodiments, the next write I/O operation is targeting data outside the LBA range of already copied remaining one or more identified segments.

The storage medium may also have instructions to delete the in-memory sharing bitmap and the disk resident virtual disk metadata, if copying the one or more identified segments is completed.

The storage medium may further have instructions to initialize in the in-memory sharing bitmap. In one embodiment, the in-memory sharing bitmap is initialized by setting each bit in the in-memory sharing bitmap to "1".

In another embodiment, the processor 502 may includes a computer system having a processing unit and a memory. The memory has code therein, the code causes the processor unit to perform the method of creating a snapclone for on-line point-in-time complete backup in the virtualized storage system 160. The method includes receiving a copy operation directed to one or more identified segments of the original virtual disk 150, in response to the copy operation, substantially sequentially copying the one or more identified segments to the snapclone virtual disk 210, clearing bits in the in-memory sharing bitmap associated with the already copied one or more identified segments, and writing the cleared bits in-memory sharing bitmap to the disk resident virtual disk metadata associated with the snapclone virtual disk 210 upon receiving the current write I/O operation from the user application while the copy operation is in progress.

Even though the above technique is described with reference to snapclone, one can envision that it can be used in snapshot applications as well.

The above-described technique significantly reduces the disk updates corresponding to the in-memory sharing bitmap. The integrity of either the in-memory sharing bitmap, disk resident sharing bitmap, or the data of the snapclone virtual disk is not compromised in any way. The above technique significantly reduces the number of write I/O operations and thereby improving the I/O performance at substantially no additional cost in terms of memory or processing overheads. In one example embodiment, the above-described method ensures that a copy operation alleviates the need to update the disk resident sharing bitmap until a first write I/O operation is issued (usually by a user application) onto the corresponding identified segments.

For example, the performance improvements as mentioned above can be analyzed as follows. Consider the conditions that no user I/O requests are issued while a snapclone operation is in progress, and the original virtual disk is one terabyte in size. As per the above-described technique, assuming a segment size of one megabyte, a complete snapclone operation requires one million (1024*1024) segments to be written to the snapclone virtual disk. This is achieved with just a single synchronous update to the disk resident sharing bitmap instead of performing one million updates. Thus, the above technique reduces the write I/O operations significantly and thereby improving the I/O performance.

The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of creating a snapclone for on-line point-in-time complete backup in a virtualized storage system, comprising:
    receiving a copy operation directed to one or more identified segments of an original virtual disk;
    in response to the copy operation, substantially sequentially copying the one or more identified segments to a snapclone virtual disk;
    clearing bits in an in-memory sharing bitmap associated with already copied one or more identified segments; and
    writing the cleared bits in the in-memory sharing bitmap to a disk resident virtual disk metadata associated with the snapclone virtual disk upon receiving a current write I/O operation while the copy operation is in progress and wherein the received current write I/O operation is substantially targeting data outside the LBA range of the already copied one or more identified segments.

2. The method of claim 1, further comprising:
    resuming the copy operation, substantially sequentially, of remaining one or more identified segments to the snapclone virtual disk;
    clearing bits in the in-memory sharing bitmap associated with already copied remaining one or more identified segments; and
    writing the cleared bits in the in-memory sharing bitmap to the disk resident virtual disk metadata associated with the snapclone virtual disk upon receiving a next write I/O operation while the copy operation is in progress and wherein the next write I/O operation is substantially targeting data outside the LBA range of the already copied remaining one or more identified segments.

3. The method of claim 1, further comprising:
    if the copying of all the one or more identified segments is completed, deleting the in-memory sharing bitmap and the disk resident virtual disk metadata.

4. The method of claim 1, further comprising:
    initializing the in-memory sharing bitmap, and wherein initializing the in-memory sharing bitmap comprises setting each bit in the in-memory sharing bitmap to "1".

5. The method of claim 1, wherein writing the cleared bits in the in-memory sharing bitmap to the disk resident virtual disk metadata associated with the snapclone virtual disk upon receiving a current write I/O operation while the copy operation is in progress comprises:
    determining whether the received current write I/O operation is targeting data outside the LBA range of the already copied remaining one or more identified segments;
    if so, writing the cleared bits in the in-memory sharing bitmap to the disk resident virtual disk metadata associated with the snapclone virtual disk upon receiving a next write I/O operation while the copy operation is in progress; and
    if not, then resuming the copy operation of the remaining one or more identified segments.

6. The method of claim 5, wherein the copy operation of the remaining one or more identified segments comprises:
    determining whether the corresponding cleared bits in the in-memory sharing bitmap are written to the on-disk sharing bitmap;
    if so, the steps of copying, clearing and writing are repeated for the remaining one or more identified segments; and
    if not, writing the cleared bits in the in-memory sharing bitmap to the on-disk sharing bitmap upon receiving a current write I/O operation while the copy operation is in progress.

7. An article, comprising:
    a storage medium having instructions, that when executed by a computing platform, result in execution of a method of creating a snapclone for on-line point-in-time complete backup in a virtualized storage system, comprising:
    receiving a copy operation directed to one or more identified segments of an original virtual disk;
    in response to the copy operation, substantially sequentially copying the one or more identified segments to a snapclone virtual disk;
    clearing bits in an in-memory sharing bitmap associated with already copied one or more identified segments; and
    writing the cleared bits in the in-memory sharing bitmap to a disk resident virtual disk metadata associated with the snapclone virtual disk upon receiving a current write I/O operation while the copy operation is in progress and wherein the received current write I/O operation is substantially targeting data outside the LBA range of the already copied one or more identified segments.

8. The article of claim 7, further comprising:
    resuming the copy operation, substantially sequentially, of remaining one or more identified segments to the snapclone virtual disk;
    clearing bits in the in-memory sharing bitmap associated with already copied remaining one or more identified segments; and
    writing the cleared bits in the in-memory sharing bitmap to the disk resident virtual disk metadata associated with the snapclone virtual disk upon receiving a next write I/O operation while the copy operation is in progress and wherein the next write I/O operation is substantially targeting data outside the LBA range of the already copied remaining one or more identified segments.

9. The article of claim 7, further comprising:
if the copying of all the one or more identified segments is completed, deleting the in-memory sharing bitmap and the disk resident virtual disk metadata.

10. The article of claim 7, wherein writing the cleared bits in the in-memory sharing bitmap to the disk resident virtual disk metadata upon receiving the current write I/O operation while the copy operation is in progress comprises:
determining whether the received current write I/O operation is targeting data outside the LBA range of the already copied remaining one or more identified segments;
if so, writing the cleared bits in the in-memory sharing bitmap to the disk resident virtual disk metadata upon receiving the current write I/O operation while the copy operation is in progress; and
if not, then resuming the copy operation of the remaining one or more identified segments.

11. A system for creating a snapclone for on-line point-in-time complete backup in a virtualized storage system, comprising:
a plurality of hosts configured to share a virtualized storage system via a storage area network (SAN) and a network storage array module, wherein in-memory sharing bitmap and disk resident virtual disk metadata associated with an original virtual disk are stored in the virtualized storage system, wherein the network storage array module comprises:
an original virtual disk;
a snapclone virtual disk;
a storage operating system including a virtual array module and wherein the virtual array module receives a copy operation directed to one or more identified segments of the original virtual disk, wherein the virtual array module substantially sequentially copies the one or more identified segments to the snapclone virtual disk upon receiving the copy operation, wherein the virtual array module clears bits in the in-memory sharing bitmap associated with already copied one or more identified segments, and wherein the virtual array module writes the cleared bits in the in-memory sharing bitmap to the disk resident virtual disk metadata upon receiving a current write I/O operation while the copy operation is in progress and wherein the received current write I/O operation is substantially targeting data outside the LBA range of the already copied one or more identified segments.

12. The system of claim 11, wherein the virtual array module resumes the copy operation, substantially sequentially, of remaining one or more identified segments to the snapclone virtual disk, wherein the virtual array module clears bits in the in-memory sharing bitmap associated with already copied remaining one or more identified segments, and wherein the virtual array module writes the cleared bits in the in-memory sharing bitmap to the disk resident virtual disk metadata upon receiving a next write I/O operation while the copy operation is in progress and wherein the next write I/O operation is substantially targeting data outside the LBA range of the already copied remaining one or more identified segments.

13. The system of claims 11, wherein the virtual array module deletes the in-memory sharing bitmap and the disk resident virtual disk metadata upon completing copying all the one or more identified segments.

14. The system of claim 11, wherein the virtual array module determines whether the received current write I/O operation is targeting data outside the LBA range of the already copied remaining one or more identified segments, wherein the virtual array module writes the cleared bits in the in-memory sharing bitmap to the disk resident virtual disk metadata upon receiving the current write I/O operation while the copy operation is in progress if the received current write I/O operation is targeting data outside the LBA range of the already copied cleared remaining one or more identified segments, and wherein the virtual array module resumes the copy operation of the remaining one or more identified segments if the received current write I/O operation is targeting data within the LBA range of the already copied cleared remaining one or more identified segments.

* * * * *